(12) United States Patent
Downey et al.

(10) Patent No.: US 6,283,635 B1
(45) Date of Patent: Sep. 4, 2001

(54) BEARING HOUSING AND COVER ASSEMBLY

(75) Inventors: George A. Downey, Torrington; J. Russell Willyard, Winsted; Dean P. Johnston, Torrington; Walter P. Waskiewicz, Bristol, all of CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/545,075

(22) Filed: Apr. 7, 2000

(51) Int. Cl.$^7$ .................................................... F16C 33/76
(52) U.S. Cl. ............................................................. 384/489
(58) Field of Search ...................................... 384/489, 477; 301/108.1

(56) References Cited

U.S. PATENT DOCUMENTS

| | | | |
|---|---|---|---|
| 4,054,335 | * 10/1977 | Timmer | 384/489 |
| 5,328,276 | * 7/1994 | Linteau | 384/477 |
| 5,380,103 | * 1/1995 | Lederman | 384/489 |
| 5,678,934 | * 10/1997 | Fischer et al. | 384/489 |
| 5,704,719 | * 1/1998 | Cook et al. | 384/484 |
| 5,711,617 | * 1/1998 | Scheller | 384/484 |
| 5,711,618 | * 1/1998 | Waskiewicz | 384/489 |
| 5,947,612 | * 9/1999 | Dennison Buck et al. | 384/536 |

\* cited by examiner

*Primary Examiner*—Thomas R. Hannon
(74) *Attorney, Agent, or Firm*—John C. Bigler

(57) ABSTRACT

A bearing housing includes a mounting for securing a bearing housing to a support surface and a bore adapted for receiving a bearing. An intermediate ring having a mechanical interlock and configured to mount over the bearing housing is positioned adjacent the bearing housing bore. An adhesive connection between the bearing housing and the intermediate ring connects the intermediate ring to the bearing housing. A bearing cover is positioned over the housing bore and engages the intermediate ring such that the mechanical interlock retains the bearing cover.

4 Claims, 3 Drawing Sheets

BEARING HOUSING AND COVER ASSEMBLY

BACKGROUND OF THE INVENTION

This invention relates generally to housed bearings and, more particularly, to housed bearings having bearing covers or caps, either for protecting bearing surfaces and lubrication from the environment or for protecting people from the rotating bearing itself.

For polymer bearing housings that are not painted, notches, grooves or slots may be molded into the housings for securing the covers or caps without major problems. Such features are of little detriment to the housing performance with respect to the environment. With such polymer housings, these features may also he machined into the housings without compromising the corrosion performance, since the material itself resists corrosion.

However, an overwhelming majority of housings are made of cast iron, such that the housings require a coating of some kind, e.g., liquid paint, powder paint or electro-coating, to improve their resistance to the environment. Additionally, cast iron housings have limitations associated with cast geometry and precision. Grooves, holes and indentations do not lend themselves to casting and require additional processing and expense.

Current practice involves fastening a bearing cover to a cast iron housing using screws that require pre-drilled holes, machined circumferential grooves in the housing, or precision machined seats to provide a press fit of a metal or polymer cap into the housing. Such machining increases the cost of the bearing housing, may weaken the bearing housing, and may expose uncoated cast iron to the environment, resulting in an expensive and vulnerable housed bearing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing housing and cover assembly comprising a bearing housing including mounting means for securing the bearing housing to a support surface and a bore adapted for receiving a bearing. An intermediate ring having mechanical interlock means and configured to mount over the bearing housing is positioned adjacent the bearing housing bore. Adhesive connecting means between the bearing housing and the intermediate ring connects the intermediate ring to the bearing housing. A bearing cover is positioned over the housing bore and engages the intermediate ring such that the mechanical interlock means retains the bearing cover.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
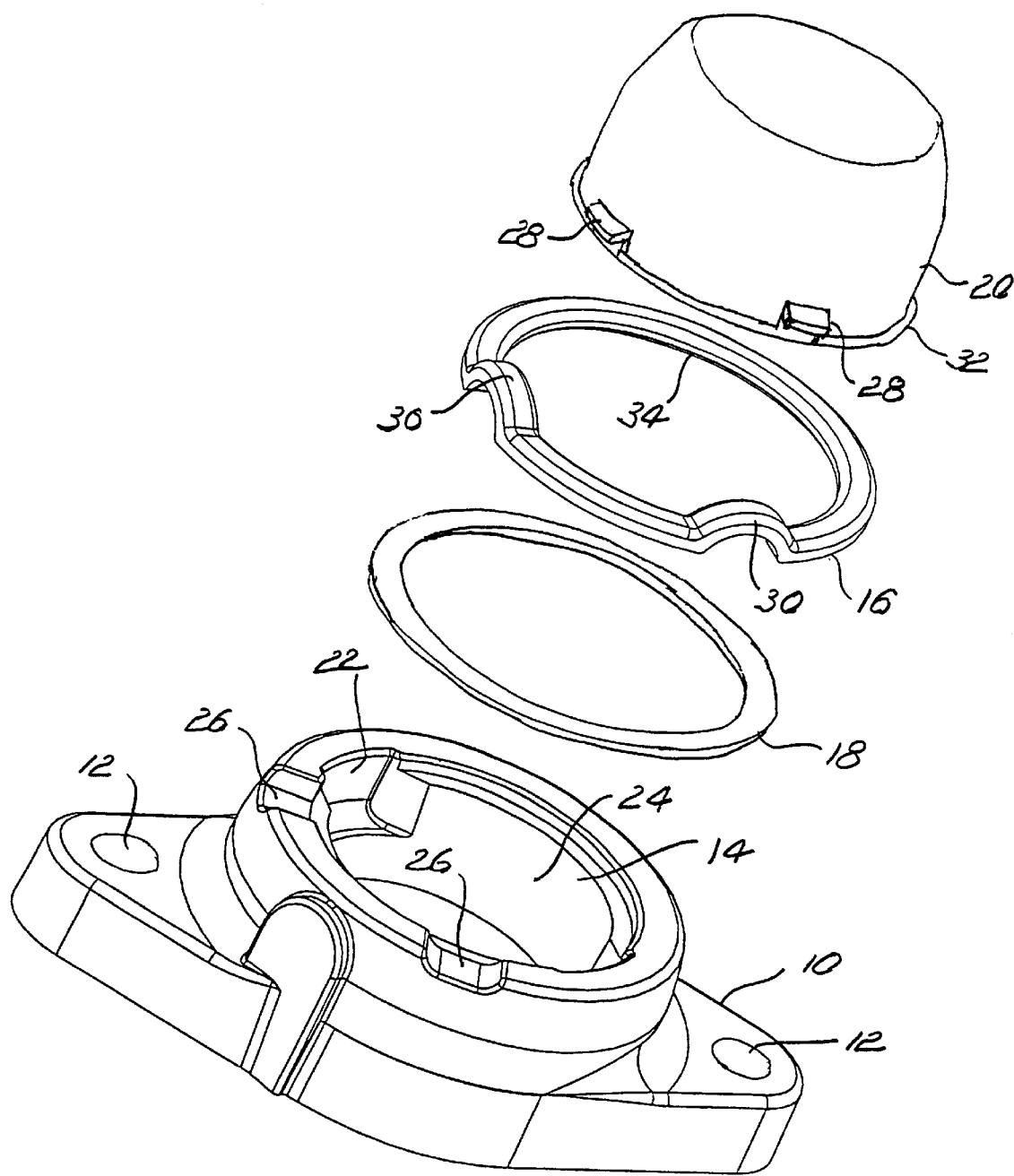
FIG. 1 is an exploded pictorial view of a bearing housing and cover assembly illustrating a first embodiment of the present invention.

Referring now to the drawings, FIG. 1 illustrates a first embodiment of the present invention, in an exploded pictorial view, with bearing housing 10 including mounting apertures or other mounting means 12, for securing bearing housing 10 to a support surface, and bore 14 adapted for receiving a bearing, not shown. The assembly also comprises intermediate ring 16, adhesive connecting means 18 between bearing housing 10 and intermediate ring 16, and bearing cover (or cap) 20, mechanically interlocked with intermediate ring 16.

In the embodiment shown in FIG. 1, bearing housing 10 includes conventional loading slots 22, for positioning a self-aligning bearing in spherical bearing seat 24, and housing notches 26, for allowing Allen wrench access to the bearing. Intermediate ring 16 includes raised portions 30 that cooperate with housing notches 26 to provide apertures for tabs 28. Bearing cover 20 includes a lip 32 along its circumference, engageable with a groove 34 in intermediate ring 16, to provide a snap-together assembly of bearing cover 20 over housing bore 14. Tabs 28 prevent rotation and facilitate removal of cover 20.

For convenience, intermediate ring 16 and bearing cover 20 may be molded of various polymers or machined or stamped of metal, and adhesive connecting means 18 may be selected of various industrial tapes and instant glues commercially available. For example, foamed acrylic adhesive tape may be used. The attachment of intermediate ring 16 by adhesive connecting means 18 eliminates the difficult task of manufacturing a retention provision in the cast bearing housing, itself. To accomplish this task without intermediate ring 16 would require machining and secondary painting while masking the bearing seat.

Figure 2:
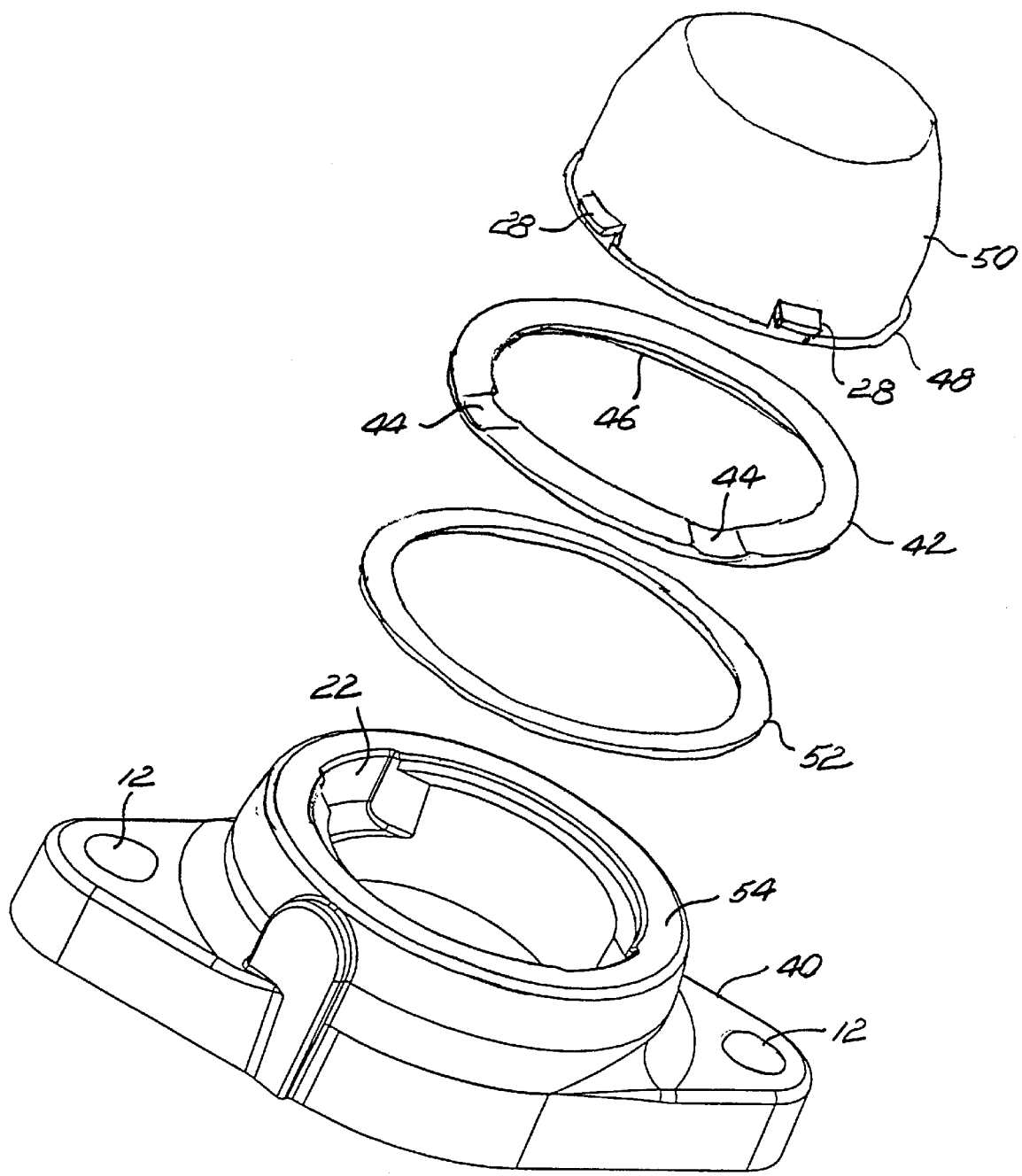
FIG. 2 is an exploded pictorial view of a bearing housing and cover assembly illustrating a second embodiment of the present invention.

FIG. 2 illustrates a second embodiment of the present invention, in an exploded pictorial view, with bearing housing 40 similar to bearing housing 10 but without housing notches. Instead, intermediate ring 42 has recesses 44 for Allen wrench access to the bearing and for receiving tabs 28. Circumferential groove 46 on intermediate ring 42 provides a snap together assembly with circumferential lip 48 of bearing cover 50. Adhesives connecting means 52 joins intermediate ring 42 to bearing housing 40 and is similar to adhesive connecting means 18.

Figure 3:
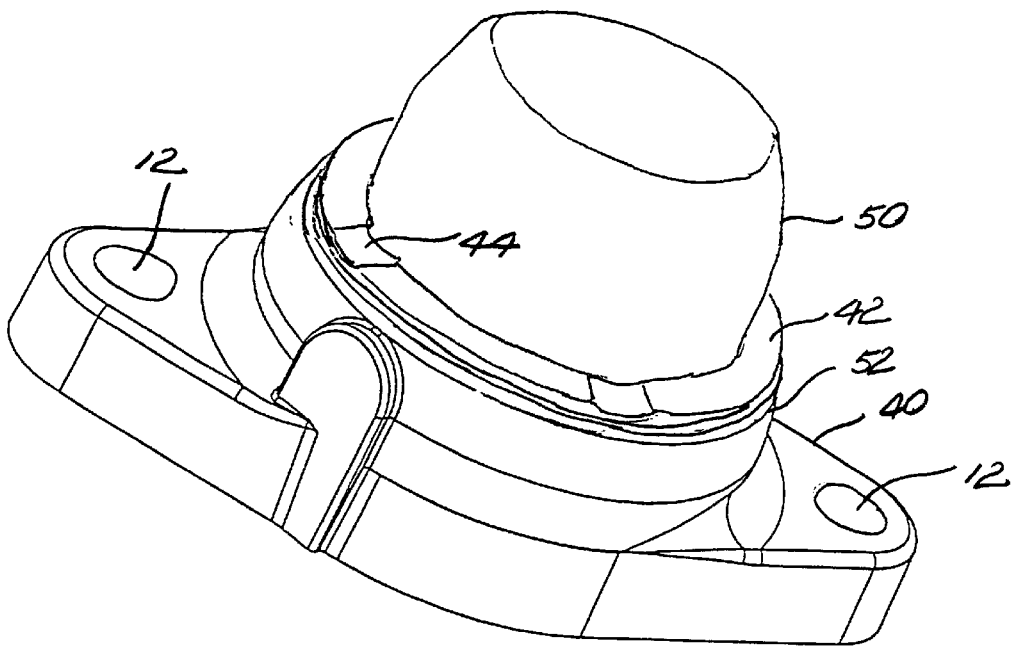
FIG. 3 is a pictorial view of the bearing housing and cover assembly of FIG. 2 after assembly.
Figure 4:
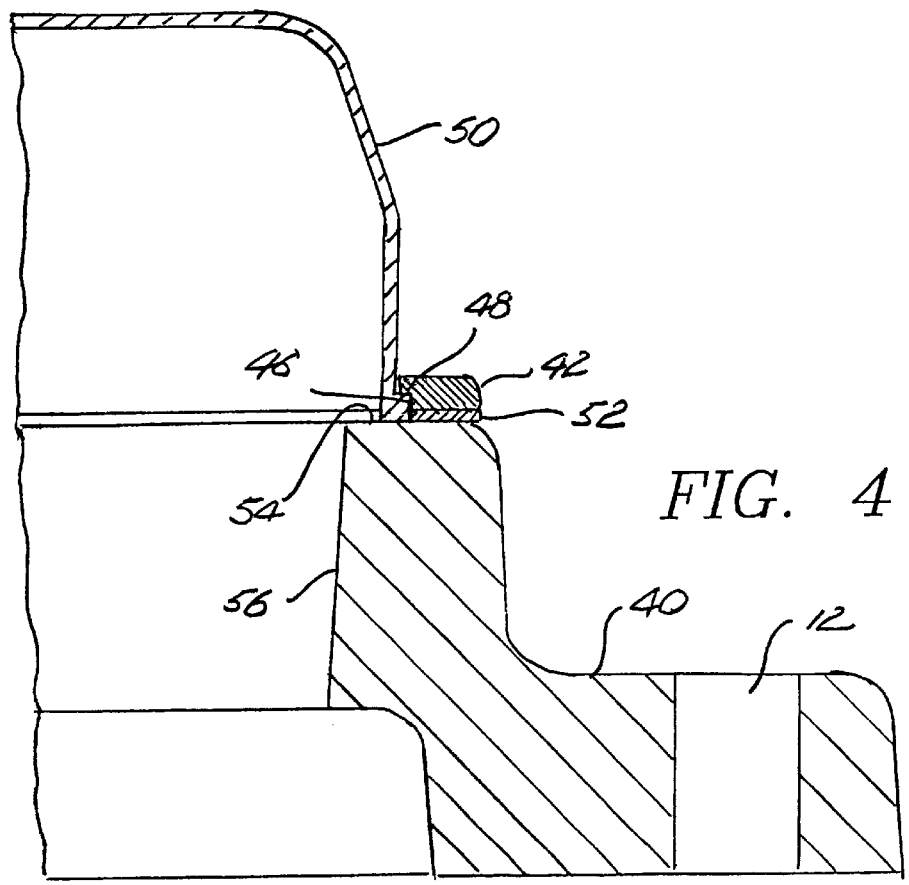
FIG. 4 is an enlarged sectional view of a portion of the bearing housing and cover assembly of FIG. 3.

FIG. 3 shows the appearance of bearing housing 40, intermediate ring 42, adhesive connecting means 52, and bearing cover 50 after assembly. FIG. 4 illustrates that circumferential lip 48 of bearing cover 50 is positioned within circumferential groove 46 of intermediate ring 42 and against an end face 54 of bearing housing 40 to retain the bearing cover 50 after assembly. As illustrated in FIG. 4, the bearing housing of the present invention may have a bore 56 with non-spherical configuration for use with bearings that are not self-aligning.

From the above description, it will be apparent that the present invention provides a bearing housing and cover assembly that eliminates the difficult task of manufacturing a retention feature in the casting itself. In some cases, this invention may allow a consumer to fasten the bearing cover over an existing bearing housing, relying on a kit supplied with an intermediate ring and bearing cover. This construction reduces the cost associated with covering housed bearings and increases the freedom of bearing housing design, since the intermediate ring and bearing cover can be attached at anytime without compromising the coating on the bearing housing.

Having described the invention, what is claimed is:

1. A bearing housing and cover assembly comprising:

a bearing housing including mounting means for securing the bearing housing to a support surface and a bore adapted for receiving a bearing;

an intermediate ring having mechanical interlock means and configured to mount over the bearing housing adjacent the bearing housing bore;

adhesive connecting means between the bearing housing and the intermediate ring for connecting the intermediate ring to the bearing housing; and a bearing cover positioned over the housing bore and engaging the intermediate ring such that the mechanical interlock means retains the bearing cover.

2. A bearing housing and cover assembly according to claim 1, wherein the mechanical interlock means on the intermediate ring includes at least one raised portion of the intermediate ring that provides an opening engageable by a tab on the bearing cover.

3. A bearing housing and cover assembly according to claim 1, wherein the mechanical interlock means on the intermediate ring includes an annular groove engageable by a circumferential lip on the bearing cover.

4. A bearing housing and cover assembly according to claim 1, wherein the adhesive connecting means is foamed acrylic adhesive tape.

* * * * *